United States Patent [19]

Kay

[11] 3,929,534
[45] Dec. 30, 1975

[54] METHOD OF MAKING A UNITARY PARTITION BY FUSING A CONNECTOR PLATE PANELS

[76] Inventor: Charles Kay, 6425 Thornapple River Drive, SE., Alto, Mich. 49302

[22] Filed: Apr. 17, 1974

[21] Appl. No.: 461,485

[52] U.S. Cl............. 156/73.5; 29/200 R; 29/470.3; 29/DIG. 48; 52/281; 156/309; 264/68
[51] Int. Cl.² ................................. B32B 31/20
[58] Field of Search ............... 156/73, 309; 52/281; 264/68; 228/2; 29/200 R, 470.3, DIG. 48

[56] References Cited
UNITED STATES PATENTS

| | | | |
|---|---|---|---|
| 3,180,774 | 4/1965 | Koch | 156/73 |
| 3,286,428 | 11/1966 | Kay | 52/496 |
| 3,346,574 | 10/1967 | Eyre et al. | 264/68 |

Primary Examiner—Edward G. Whitby
Attorney, Agent, or Firm—Price, Heneveld, Huizenga & Cooper

[57] ABSTRACT

In the construction of structural and furniture partitions, transverse connector plates are interlocked with spaced panels by driving the flanged edges of the plates into the panels with sufficient force and velocity to momentarily thermally fuse an adhesive therebetween by friction-generated-heat, thereby bonding the plate and panels together. The transverse plates extend along the peripheral edge portions of the polygonal panels to generally close off the space therebetween.

8 Claims, 7 Drawing Figures

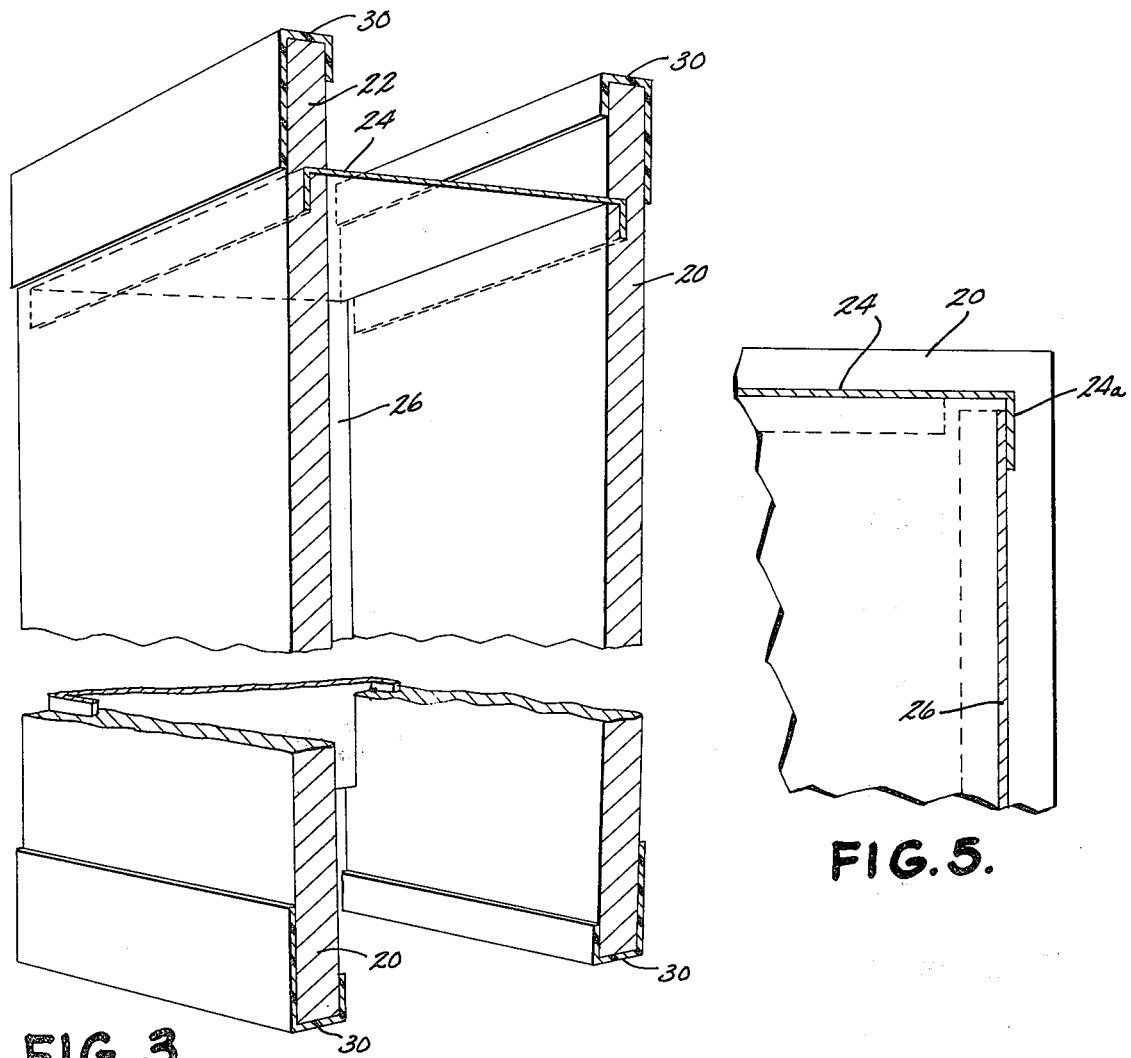
FIG. 3.
FIG. 5.
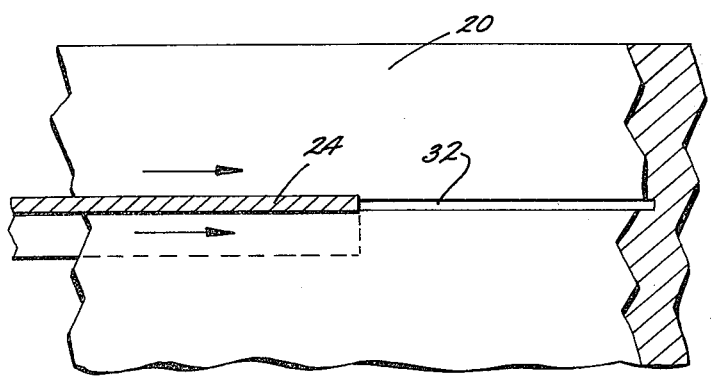
FIG. 4.

METHOD OF MAKING A UNITARY PARTITION BY FUSING A CONNECTOR PLATE PANELS

BACKGROUND OF THE INVENTION

This invention relates to partition construction, and more particularly to the assembly of partitions for structural and/or furniture usage.

Over the last several years, the inventor herein has developed structures assembled with panels and transverse connecting plates and machines associated therewith as set forth in U.S. Pat. Nos. 3,286,428, 3,574,253, 3,603,060, 3,714,696 and 3,751,794. The present invention constitutes an improvement of the developments set forth in said patents.

SUMMARY OF THE INVENTION

It is an object of this development to provide a structural and/or furniture partition formed of panels secured together by transverse plates, the plates having flanges which are purposely driven into the panels with sufficient force and velocity to generate frictional heat adequate to momentarily fuse a thermally responsive bonding agent between the plate edges and panels. A plurality of plates are used, these being oriented at different angles to each other, and preferably interconnected.

Another object is to provide a partition formed with spaced panels interconnected by flanged plates, the elongated plates extending along and adjacent the peripheral edges of the panels to complete the structure and close off the space between the panels. These plates preferably are formed to overlap and be joined at the ends thereof, adjacent the corners of the partition, for maximum strength and optimum appearance.

BRIEF DESCRIPTION OF THE DRAWINGS

FIG. 3 is an enlarged fragmentary view of a portion of the partition;

FIG. 4 is an enlarged fragmentary view showing a plate being forced into a panel;

FIG. 5 is a fragmentary elevational enlarged view of one corner of the partition showing the plate overlap and juncture;

DESCRIPTION OF THE PREFERRED EMBODIMENT

Figure 1:
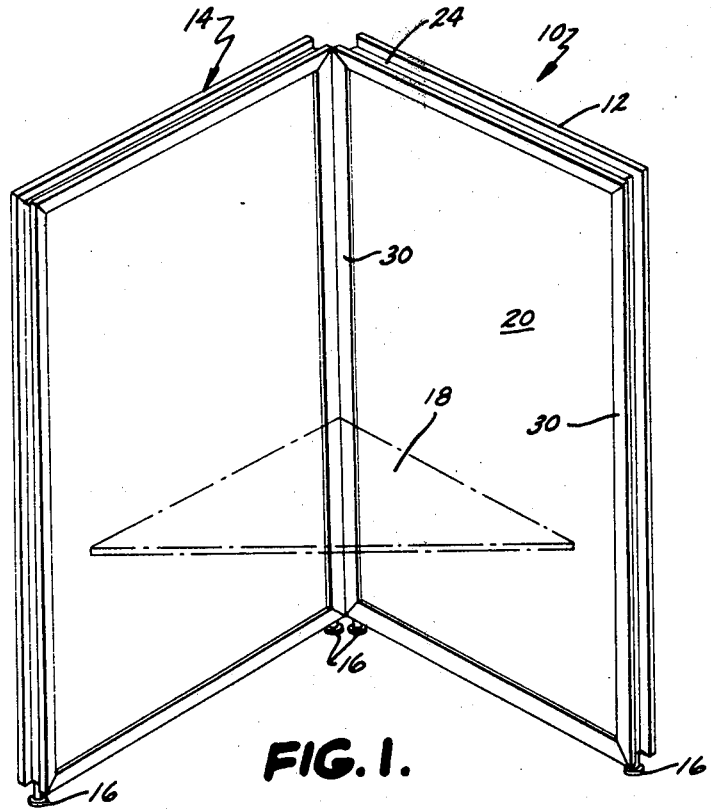
FIG. 1 is a perspective view of a pair of partitions forming an illustrative office partitioning system.

The partition assembly 10 depicted as an illustrative example in FIG. 1 is actually formed of two like partitions 12 and 14 interconnected as by hinges or the like, and supported by any desirable form of feet or pedestals 16. If desired, these may support a work surface or platform 18 or the like therebetween, as depicted in phantom. The partitions formed according to the teachings herein may be used as in offices as furniture partitions or structural partitions. The terminology "furniture partitions" is intended to include room dividers, work surface supports, modesty screens, cabinet walls, doors, or the like. The terminology "structural partition" is intended to include load bearing members as for ceilings and walls. Clearly, one partition can be mounted on others, e.g. desk tops, work platforms, or the like suspended on dividers, walls, etc. As will be understood, some partitions serve both functions.

Figure 2:
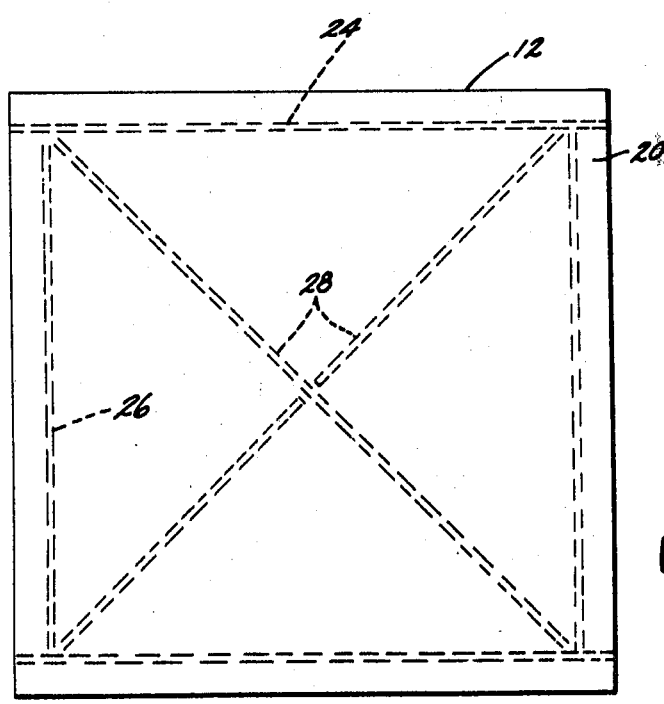
FIG. 2 is an elevational view of a partition, depicting illustrative multidirection orientation of the plate connecting panels and peripheral closure thereby.

Each partition, e.g. partition 12, is basically formed of a pair of spaced panels e.g. 20 and 22 (FIG. 3) interconnected by the elongated flanged plates. Each panel is normally polygonal in configuration, e.g. rectangular as in FIG. 1 or square as in FIG. 2. Such can be prefinished, unfinished, partially finished, wood, fiberboard, polymeric, fabricated as of pressed board, coated, laminated, e.g. cloth, paper, or polymer covered, and of desired thickness. These panels 20 are joined by the elongated connector plates, e.g. 24, 26, etc. (FIG. 3) around at least three edges of the partition periphery, usually four, and preferably by plates 28 in the central zones of the panels.

The elongated plates have transverse flanges on opposite edges thereof. These plates are preferably of a sturdy metal such as steel or aluminum, but in some instances can be a polymer e.g. fiberglass reinforced polyvinylchloride, polypropylene, or others, or a laminated product e.g. a metal plate having a dress covering or coating of plastic, paper, cloth, veneer, or the like. The flanged side edges of each plate are forcefully driven into an embedded condition in the panels. For ease of assembly, each of the panels is preferably previously scored prior to the plates being driven in place, to form a score line or groove 32 (FIG. 4).

The plates are oriented at angles to each other in the completed assembly for optimum support and resistance to racking. For example, the plates depicted in FIG. 2 extend in four directions around the periphery of the partition. Optimally two diagonal plates are included for reinforcing support.

The peripheral plates not only secure the panels together for strength of the assembly, but also generally close off the space between the panels to provide a dress finish to the exterior of the panel. These plates are placed as close to the peripheral edge of the polygonal panels as possible, e.g. about one inch or so inwardly a minor amount from the panel edges, depending on the thickness and material of the panel, plate thickness, and depth of scoring. The controlling factors are the aesthetic effect desired, and the necessary strength of the completed assembly. Placing these plates too close to the edge could cause splitting of the panels, so this is taken into consideration also. They therefore extend substantially the length of the panel edges. The overlapping panel edges, i.e. the portions extending beyond the plates, can be covered with dress strips 30 as depicted in FIG. 3.

Preferably, at the corners of the partition, the ends of the plates are interlocked as by joining them through welding techniques or the like (FIG. 5). This can be achieved by having the central panel 24a of one plate, e.g. 24 extend beyond its flanges so as to be formable as by bending into overlapping relationship with the adjacent plate, followed by resistance welding, bolting, riveting, or the like of these overlapping portions. This adds strength as well as completely finishing the corner portion for aesthetic purposes.

Figure 6:
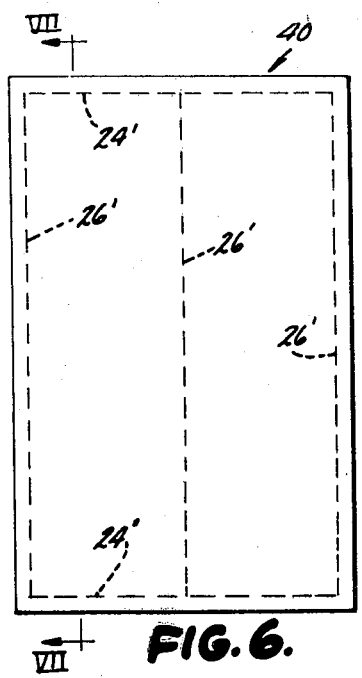
FIG. 6 is an elevational view of a door type partition formed according to the invention.
Figure 7:
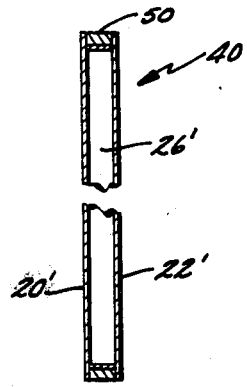
FIG. 7 is a sectional view of the partition in FIG. 6, taken on plane VII—VII.

If desired, the peripheral groove between the outer edges of the spaced panels and adjacent the flanged plates can be filled with a filler strip sized to fit therein. The door 40 depicted in FIGS. 6 and 7 is illustrative of this, being formed of spaced panels 20' and 22' interconnected by three vertical plates 26', two of which are at the vertical edges and the third down the center of the panels, and a pair of horizontal plates 24' along the upper and lower edges of the panels. Filling the peripheral groove is an elongated filler 50 as of wood, polymer or other material, bonded therein as by adhesive, between the outer panel edges and outwardly of the plates.

Also, it is significant to bond the edges of the flanged plates in place in the panels. Some composite panels are formed with a polymeric material which is heat fusible i.e. thermally responsive. When at least the portions of the panel into which the plate flange is inserted contain such a material, advantage is taken of this characteristic to bond the plate to the panel. The plates are purposely driven rapidly enough and forcefully enough into such panels to momentarily fuse the polymeric material at the interface immediately adjacent the flanged edges of the plates so that, with subsequent cooling after the plate is in position, the fused bonding agent cools, re-solidifies and locks the assembly together. In the event that the panels are formed of a material which is not thermally responsive, a bonding agent is added to the flanged edges of the plates such that, when driven into position, the bonding agent will momentarily soften by the frictional heat to an adhesive condition and subsequently harden as it cools to lock the plate to the panels. Typical bonding agents include the usual thermoplastic materials widely available, e.g. PVC, polyethylene, acrylics, and the like.

The invention which is explained herein relative to the illustrative preferred embodiment can be modified in various ways to suit particular uses as will be readily apparent to those in the art after reviewing this disclosure, and is intended to be limited only by the appended claims and the equivalents thereto.

The embodiments of the invention in which an exclusive property or privilege is claimed are defined as follows.

1. A method of locking the flanged edge of a connector plate to a selected portion of a panel comprising the steps of providing a heat-fusible bonding agent to at least one of (a) the flanged edge of the connector plate and (b) the interior of said panel selected portion; driving the flanged edge of the plate into the selected portion of the panel, with sufficient force and velocity to generate frictional heat adequate to momentarily fuse the bonding agent between the flanged edge and the selected portion; and retaining the panel and plate in fixed relationship until the bonding agent cools and locks the edge of the plate to the panel.

2. A method of locking a connector plate to a designated zone of a structural or furniture panel, comprising the steps of: providing a connector plate having an edge flange, providing a panel, providing a heat fusible bonding agent to at least one of (a) the flanged edge of the connector plate and (b) the interior of said panel selected portion; driving the flanged edge of the plate into the selected portion of the panel, with sufficient force and velocity to generate frictional heat adequate to momentarily fuse the bonding agent between the flanged edge and the selected portion; and retaining the panel and plate in fixed relationship until the bonding agent cools and locks the edge of the plate to the panel.

3. A method as recited in claim 1 further comprising:
providing two panels in spaced, parallel relationship, and
driving into the panels a plurality of plates arranged generally normal to each other, so each plate engages perpendicularly opposed portions of the panels thereby substantially enclosing a central space between the two panels and forming a connection between the two panels.

4. A method as recited in claim 3 further comprising:
filling with a peripheral filler means a space between the two panels outwardly of said plates to the peripheral panel edges.

5. A method as recited in claim 4 further comprising:
welding adjoining plates to each other thereby strengthening the connection of the two panels.

6. A method as recited in claim 2 further comprising:
providing two panels in spaced, parallel relationship, and
driving into the panels a plurality of plates arranged generally normal to each other, so each plate engages perpendicularly opposed portions of the panels thereby substantially enclosing a central space between the two panels and forming a connection between the two panels.

7. A method as recited in claim 6 further comprising:
filling with a peripheral filler means a space between the two panels outwardly of said plates to the peripheral panel edges.

8. A method as recited in claim 7 further comprising:
welding adjoining plates to each other thereby strengthening the connection of the two panels.

* * * * *